(12) United States Patent
Pompe et al.

(10) Patent No.: US 11,592,564 B2
(45) Date of Patent: Feb. 28, 2023

(54) SYSTEM AND METHOD OF REGISTERING POINT CLOUD DATA USING SUBSAMPLE DATA

(71) Applicant: FARO Technologies, Inc., Lake Mary, FL (US)

(72) Inventors: Daniel Pompe, Stuttgart (DE); Manuel Caputo, Schwieberdingen (DE); José Gerardo Gómez Méndez, Korntal-Münchingen (DE); Zia ul Azam, Korntal-Münchingen (DE); Louis Bergmann, Stuttgart (DE); Daniel Flohr, Stuttgart (DE); Oliver Zweigle, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 64 days.

(21) Appl. No.: 17/354,607

(22) Filed: Jun. 22, 2021

(65) Prior Publication Data
US 2021/0318438 A1  Oct. 14, 2021

Related U.S. Application Data

(63) Continuation of application No. 16/908,877, filed on Jun. 23, 2020, now Pat. No. 11,086,015.
(Continued)

(51) Int. Cl.
*G01S 17/46* (2006.01)
*G01B 11/00* (2006.01)
(Continued)

(52) U.S. Cl.
CPC ............ *G01S 17/46* (2013.01); *G01B 11/002* (2013.01); *G01B 11/2545* (2013.01); *G01B 11/272* (2013.01); *G01S 17/36* (2013.01)

(58) Field of Classification Search
CPC ....... G01S 17/46; G01S 17/36; G01B 11/002; G01B 11/2545; G01B 11/272; H04N 1/3876
See application file for complete search history.

(56) References Cited

U.S. PATENT DOCUMENTS 8,705,012 B2  4/2014  Greiner et al.
9,074,878 B2  7/2015  Steffey et al.
(Continued)

FOREIGN PATENT DOCUMENTS

WO  2014039623 A1  3/2014

OTHER PUBLICATIONS

European Office Action; dated Apr. 26, 2022; Application No. 20181326.8; Filed: Jun. 22, 2020; 7 pages.
(Continued)

*Primary Examiner* — Roy M Punnoose
(74) *Attorney, Agent, or Firm* — Cantor Colburn LLP

(57) ABSTRACT

A system of generating a three-dimensional (3D) scan of an environment includes multiple 3D scanners including a first 3D scanner at respective first and second positions. The system further includes a controller coupled to the 3D scanners via a common communications network. The first scanner and second scanner transmit a subset of data to the controller while acquiring a set of 3D coordinates. The controller registers the subsets of data to each other while the sets of 3D coordinates is being acquired.

19 Claims, 12 Drawing Sheets

Related U.S. Application Data

(60) Provisional application No. 62/866,697, filed on Jun. 26, 2019.

(51) Int. Cl.
  *G01B 11/25* (2006.01)
  *G01B 11/27* (2006.01)
  *G01S 17/36* (2006.01)

(56) References Cited

U.S. PATENT DOCUMENTS

| | | | |
|---|---|---|---|
| 9,115,968 B1 | 8/2015 | Abruzzo et al. | |
| 9,372,265 B2 | 6/2016 | Zweigle et al. | |
| 9,448,059 B2 | 9/2016 | Bridges et al. | |
| 9,689,972 B2 | 6/2017 | Becker et al. | |
| 10,304,237 B2* | 5/2019 | Sequeira | G05D 1/024 |
| 2013/0108116 A1* | 5/2013 | Suzuki | G06V 20/647 |
| | | | 382/106 |
| 2018/0014002 A1* | 1/2018 | Vollrath | G01C 3/08 |
| 2018/0075643 A1* | 3/2018 | Sequeira | G01S 7/4808 |
| 2018/0202797 A1* | 7/2018 | Kawashima | G06T 7/62 |
| 2019/0064510 A1 | 2/2019 | Flohr | |
| 2020/0043186 A1 | 2/2020 | Selviah et al. | |
| 2020/0265621 A1* | 8/2020 | Santos | H04N 13/243 |
| 2020/0408913 A1 | 12/2020 | Pompe | |

OTHER PUBLICATIONS

Author Unknown, "ZF-Laser—blue workflow," https://www.zf-laser.com/blue-workflow-R.3dscanning.0.html?&L=1, accessed online Jan. 17, 2019; 2 pages.

Extended European Search Report issued in Application No. 20181326.8-1209, dated Oct. 13, 2020; 9 pages.

Held, et al., "Z+F's New Imager 5010X Scanner Enables Field Registration—SPAR 3D," Conference held Mar. 31, 2015, accessed online Jan. 17, 2019; https://www.spar3d.com/news/hardware/vol13no13-z-f-announces-imager-5010x-scanner-and-scout-tablet-software/(3 pages).

* cited by examiner

SYSTEM AND METHOD OF REGISTERING POINT CLOUD DATA USING SUBSAMPLE DATA

CROSS REFERENCE TO RELATED APPLICATIONS

This application is a continuation application of U.S. patent application Ser. No. 16/908,877 filed on Jun. 23, 2020, which claims the benefit of U.S. Provisional Application Ser. No. 62/866,697 filed Jun. 26, 2019, the contents of both of which is incorporated herein by reference.

BACKGROUND

The present application is directed to a system that optically scans an environment, such as a building, and in particular to generating a point cloud of the scanned environment by combining scanned data of the environment that is acquired by multiple scanner devices.

The automated creation of digital point clouds for existing structures is desirable as it allows the size and shape of the environment to be used in many processes. For example, a 2D or 3D floorplan may be generated from the captured point clouds, the floorplan desirable in search and rescue missions, security missions, army applications, and other such mission critical applications. Such floorplans may find other uses such as in documenting a building for a fire department or to document a crime scene, in the planning of construction or remodeling of a building, and the like. Various other uses of the floorplan can be envisioned.

Existing measurement systems typically use a scanning device that determines coordinates of surfaces in the environment by emitting a light and capturing a reflection to determine a distance or by triangulation using cameras. These scanning devices are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation. Further yet, such scanning requires a single scanning equipment to be moved in the environment to capture different sections sequentially.

Accordingly, while existing scanners are suitable for their intended purposes, what is needed is a system for having certain features of embodiments of the present invention.

BRIEF DESCRIPTION

According to one or more embodiments, a system of generating a three-dimensional (3D) scan of an environment includes a set of 3D scanners that includes a first 3D scanner at a first position and a second 3D scanner at a second position, the first position being different from the second position. A controller is operably coupled to the 3D scanners via a common communications network. The first 3D scanner is configured to acquire a first set of 3D coordinates and generate a first subsample data of the first set of 3D coordinates, the first 3D scanner is further configured to transmit the first subsample data to the controller. The second 3D scanner is configured to acquire a second set of 3D coordinates and generate a second subsample data of the second set of 3D coordinates, the second 3D scanner is further configured to transmit second subsample data to the controller. The controller is configured to register the first subsample data and the second subsample data to each other while the first set of 3D coordinates and the second set of 3D coordinates are being acquired.

According to one or more embodiments, a method of scanning an environment includes positioning a first 3D scanner in a first position and positioning a second 3D scanner in a second position, the second position being different than the first position. The method further includes connecting the first 3D scanner, the second 3D scanner, and a controller to a common communications network. A first set of 3D coordinates is acquired with the first 3D scanner. A first subsample data is generated from the first set of 3D coordinates. A second set of 3D coordinates is acquired with the second 3D scanner. A second subsample data is generated from the second set of 3D coordinates. The first subsample data and the second subsample data is transmitted to the controller while the first set of 3D coordinates and the second set of 3D coordinates are being acquired. The first subsample data and the second subsample data are registered to each other while the first set of 3D coordinates and the second set of 3D coordinates are being acquired.

According to one or more embodiments, a system includes a display device, a memory device, and a controller that includes one or more processors coupled with the display device and the memory device. The controller receives, substantially simultaneously, via a common communications network, first subsample data of a first set of 3D coordinates being acquired by a first 3D scanner and a second subsample data of a second set of 3D coordinates being acquired by a second 3D scanner. The controller further registers the first subsample data and the second subsample data to each other while the first set of 3D coordinates and the second set of 3D coordinates are being acquired.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments of the present disclosure relate to a device that includes a system having multiple three-dimensional (3D) scanners that work cooperatively to capture 3D point cloud data of an environment. The point cloud(s) can be used to generate a map of an environment. The environment can be an interior of a building, a room, a floor, an office, a house, a manufacturing facility, a theater, a stadium, an airport, a bus station, a train station, or any other such closed or partially closed environment. The environment can also include outdoor environment such as a park, a stadium, a parking lot, and the like. In an embodiment, the 2D and/or a 3D map is generated in real-time or near real-time.

Figure 1:
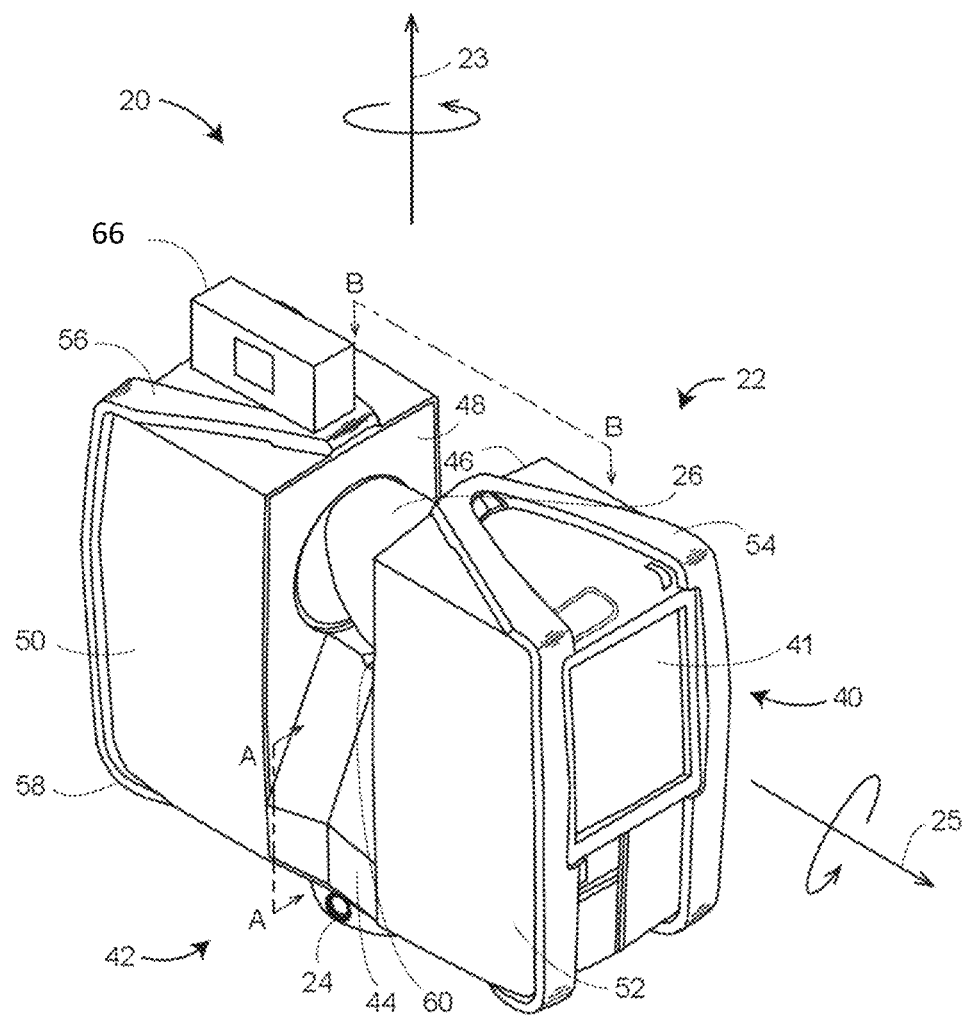
FIG. 1 is a perspective view of a laser scanner in accordance with an embodiment of the invention.
Figure 2:
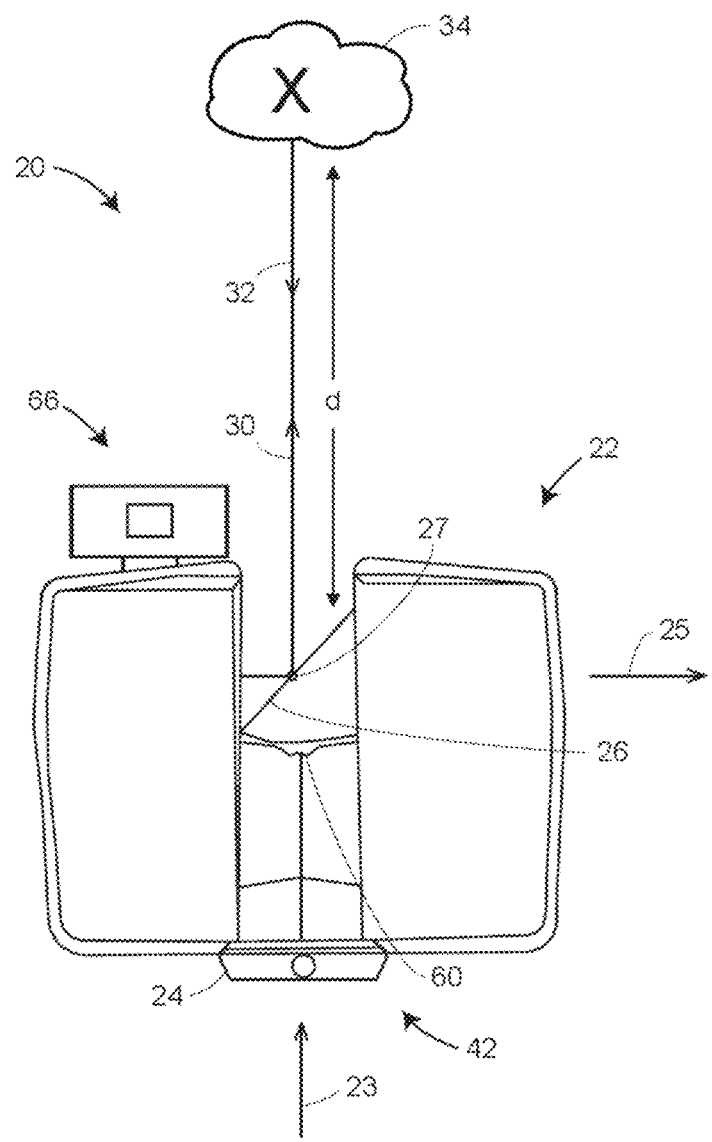
FIG. 2 is a side view of the laser scanner illustrating a method of measurement according to an embodiment.
Figure 3:
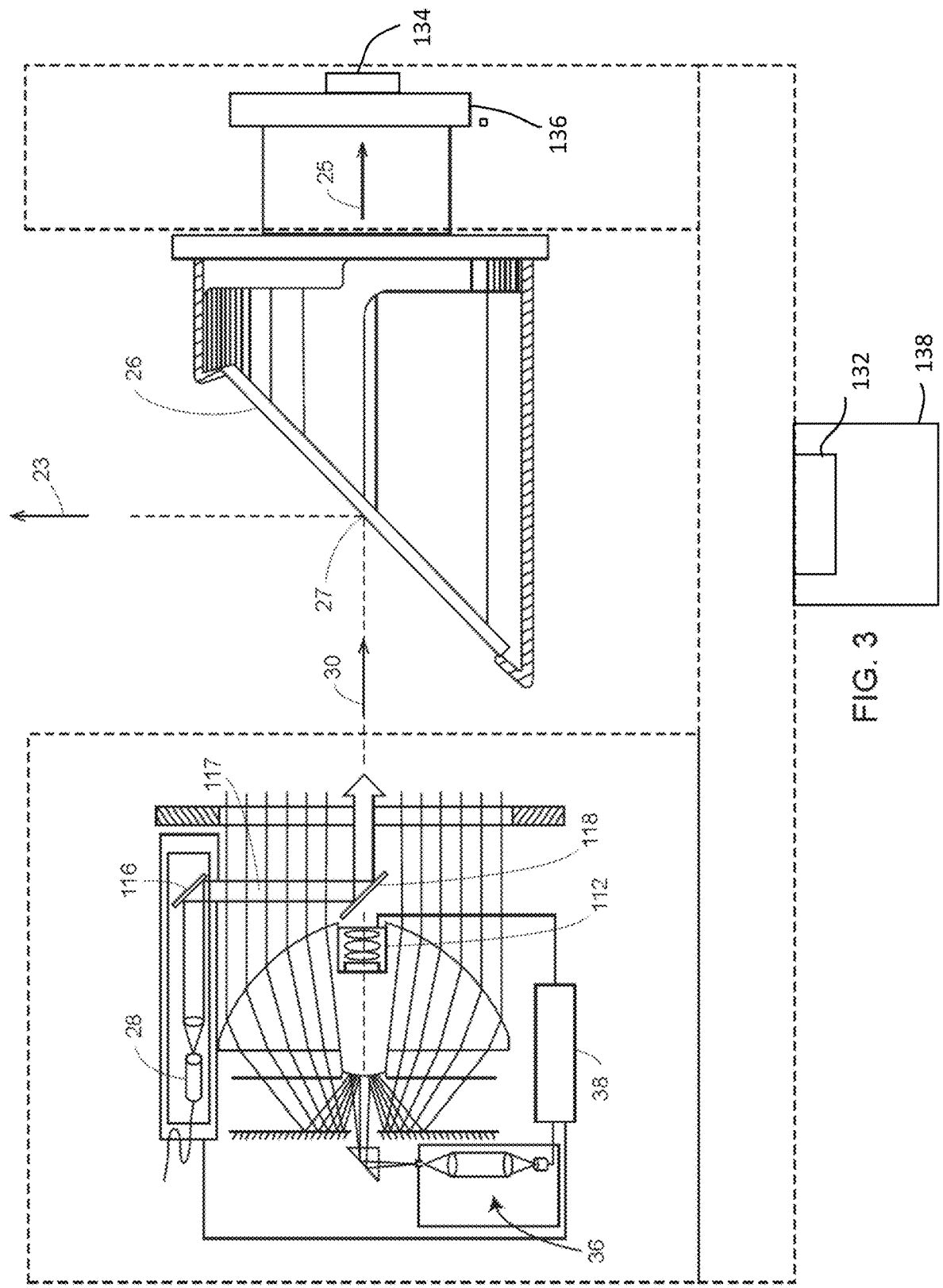
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. It should be noted that although a particular type of laser scanner (e.g. a stationary time of flight or phase-based laser scanner) is used for describing one or more embodiments herein, any type of 3D scanner device can be used in other embodiments. A handheld scanner or movable scanners may be used in in one or more examples. Additionally, the principle of operation of the scanner device does not limit the features of the embodiments described herein. For example, the scanner 20 described herein is a laser scanner, however, in one or more embodiments, different types of scanning technology may be relied upon by the scanner 20, such as but not limited to triangulation scanners, area scanners, laser line probes, structured light scanners, photogrammetry devices, or a combination of the foregoing. Other scanners may include those described in commonly owned U.S. Pat. Nos. 9,448,059, 9,074,878, 9,372,265, and 9,115,968, the contents of which are incorporated by reference herein.

In FIGS. 1-3, the laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
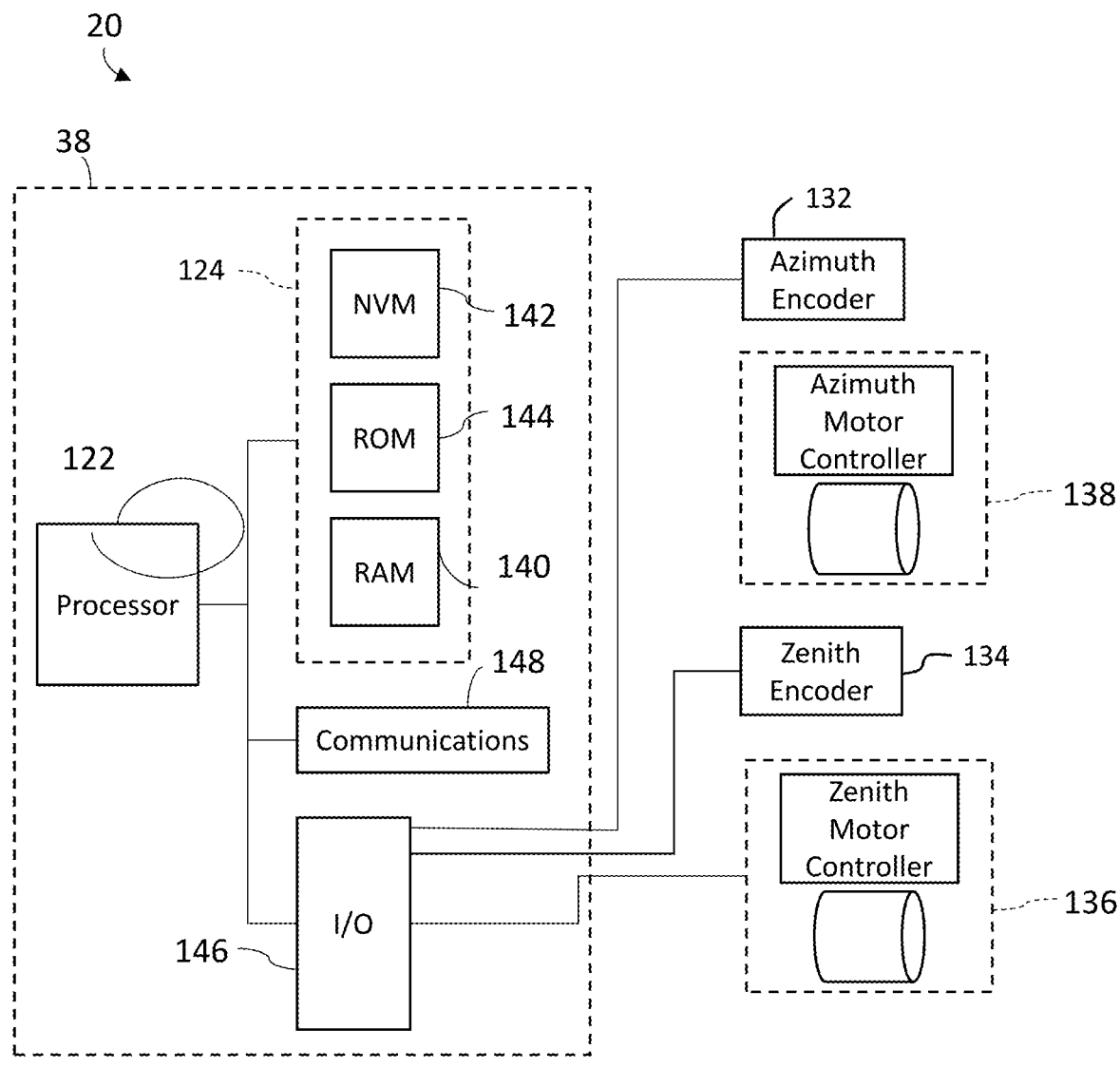
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in application code. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 5:
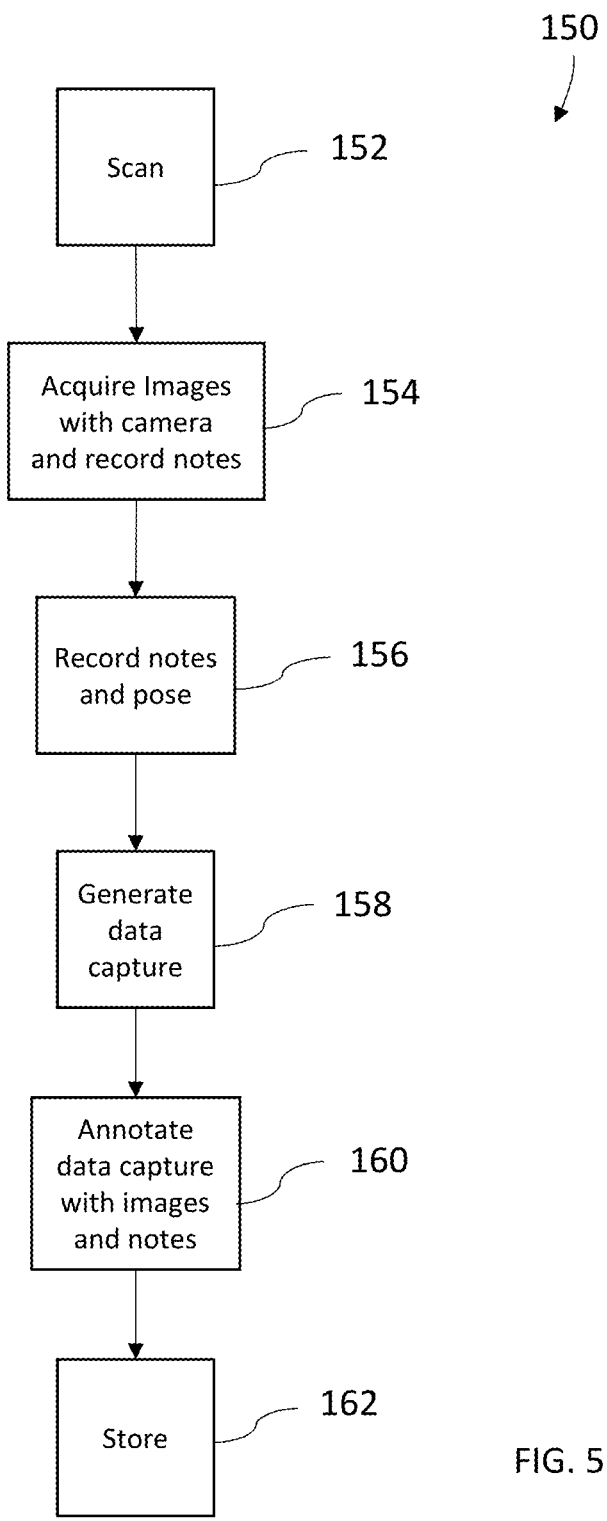
FIG. 5 is a flow diagram of a method of generating a data capture with annotations in accordance with an embodiment.

Referring now to FIG. 5, a method 150 is shown for capturing data of an environment according to one or more embodiments. The data capture can include 3D point clouds that include coordinate information for one or more points that are scanned by the scanner 20. It should be appreciated that in one or more embodiments a 2D map may be generated from the 3D coordinate data by selecting a plane through the data capture. In an embodiment, the method 150 starts in block 152 with the operator initiating the scanning of an area or facility with the system 20 as described herein. The method 150 then proceeds to block 154 wherein the operator acquires images with a camera during the scanning process. The images may be acquired by a camera located in a mobile computing device (e.g. personal digital assistant, cellular phone, tablet or laptop) carried by the operator, or from a camera coupled to or integrated with the system 20 for example. In an embodiment, the system 20 may include a holder (not shown) that couples the mobile computing device to the system 20. In block 154, the operator may further record notes. These notes may be audio notes or sounds recorded by a microphone in the mobile computing device. These notes may further be textual notes input using a keyboard on the mobile computing device. It should be appreciated that the acquiring of images and recording of notes may be performed simultaneously, such as when the operator acquires a video. In an embodiment, the recording of the images or notes may be performed using a software application executed on a processor of the mobile computing device. The software application may be configured to communicate with the system 20, such as by a wired or wireless (e.g. Bluetooth™) connection for example, to transmit the acquired images or recorded notes to the system 20. In one embodiment, the operator may initiate the image acquisition by actuating actuator 38 that causes the software application to transition to an image acquisition mode.

Figure 6:
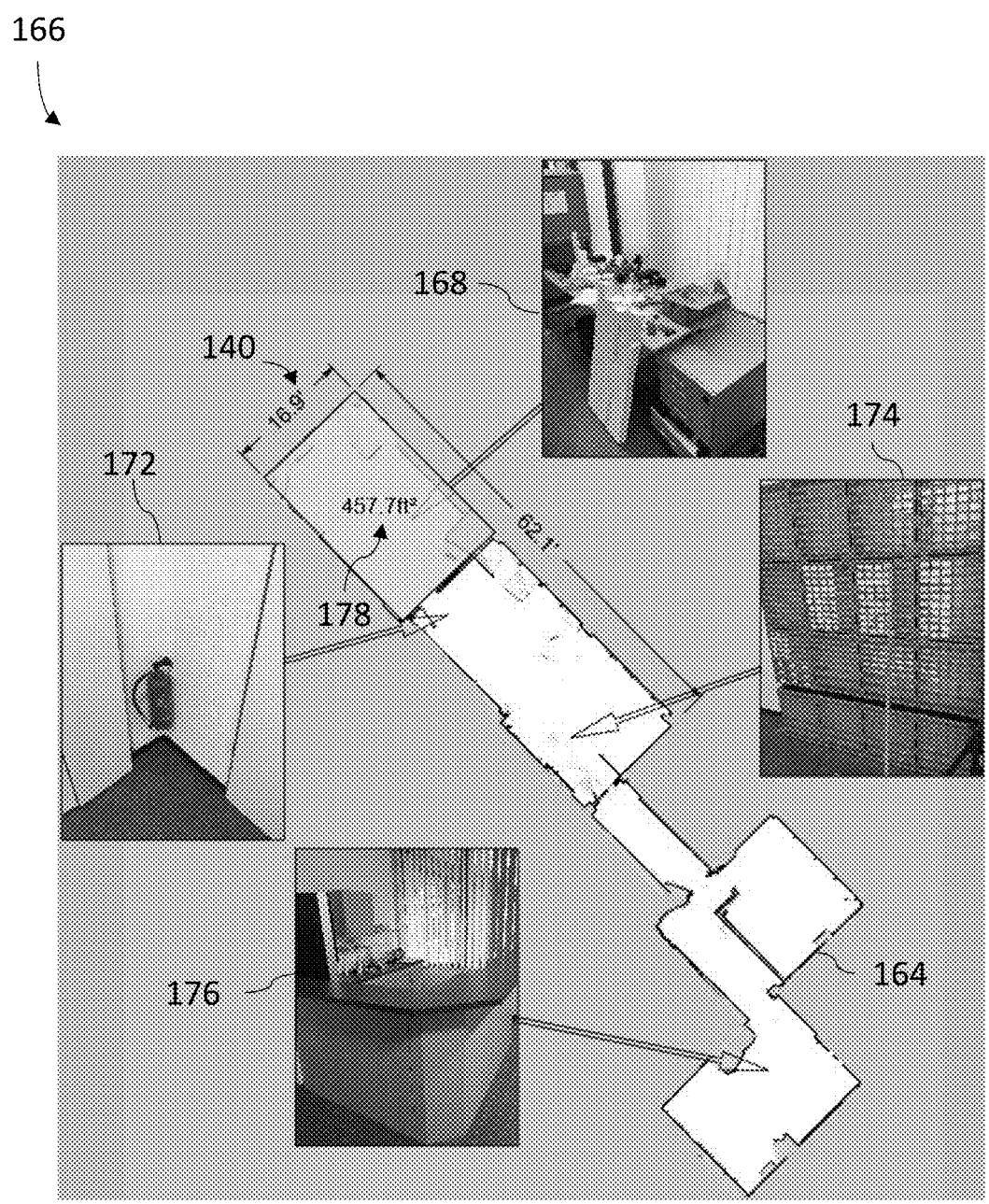
FIG. 6 is an annotated data capture from the method of FIG. 5 in accordance with an embodiment.

The method 150 then proceeds to block 156 where the images and notes are stored in memory, such as memory 80 for example. In an embodiment, the data on the pose of the system 20 is stored with the images and notes. In still another embodiment, the time or the location of the system 20 when the images are acquired or notes were recorded is also stored. Once the scanning of the area or facility is completed, the method 150 then proceeds to block 158 where a map 164 (FIG. 6) is generated as described herein. The method then proceeds to block 160 where an annotated map 166 (FIG. 6) is generated. It should be noted that in one or more examples, the annotations are made on the 3D point cloud(s) that are part of the data capture directly, although, for explanation purposes, the description herein uses an annotated map as an example. The annotations may include user-defined annotations, such as dimensions 140 or room size 178. The annotations may further include user-defined free-form text or hyperlinks for example. Further, in the exemplary embodiment, the acquired images 168 and recorded notes are integrated into the annotated map 166. In an embodiment, the image annotations are positioned to the side of the map 164 the image was acquired or the note recorded. It should be appreciated that the images provide information to the operator on the location of objects, obstructions and structures, such as but not limited to fire extinguisher 172, barrier 174 and counter/desk 176 for example. Finally, the method 150 proceeds to block 162 where the annotated data capture is stored in memory.

It should be appreciated that the image or note annotations may be advantageous in embodiments where the data capture is generated for public safety personnel, such as a fire fighter for example. The images allow the fire fighter to anticipate obstructions that may not be seen in the limited visibility conditions such as during a fire in the facility. The image or note annotations may further be advantageous in police or criminal investigations for documenting a crime scene and allow the investigator to make contemporaneous notes on what they find while performing the scan.

Figure 7:
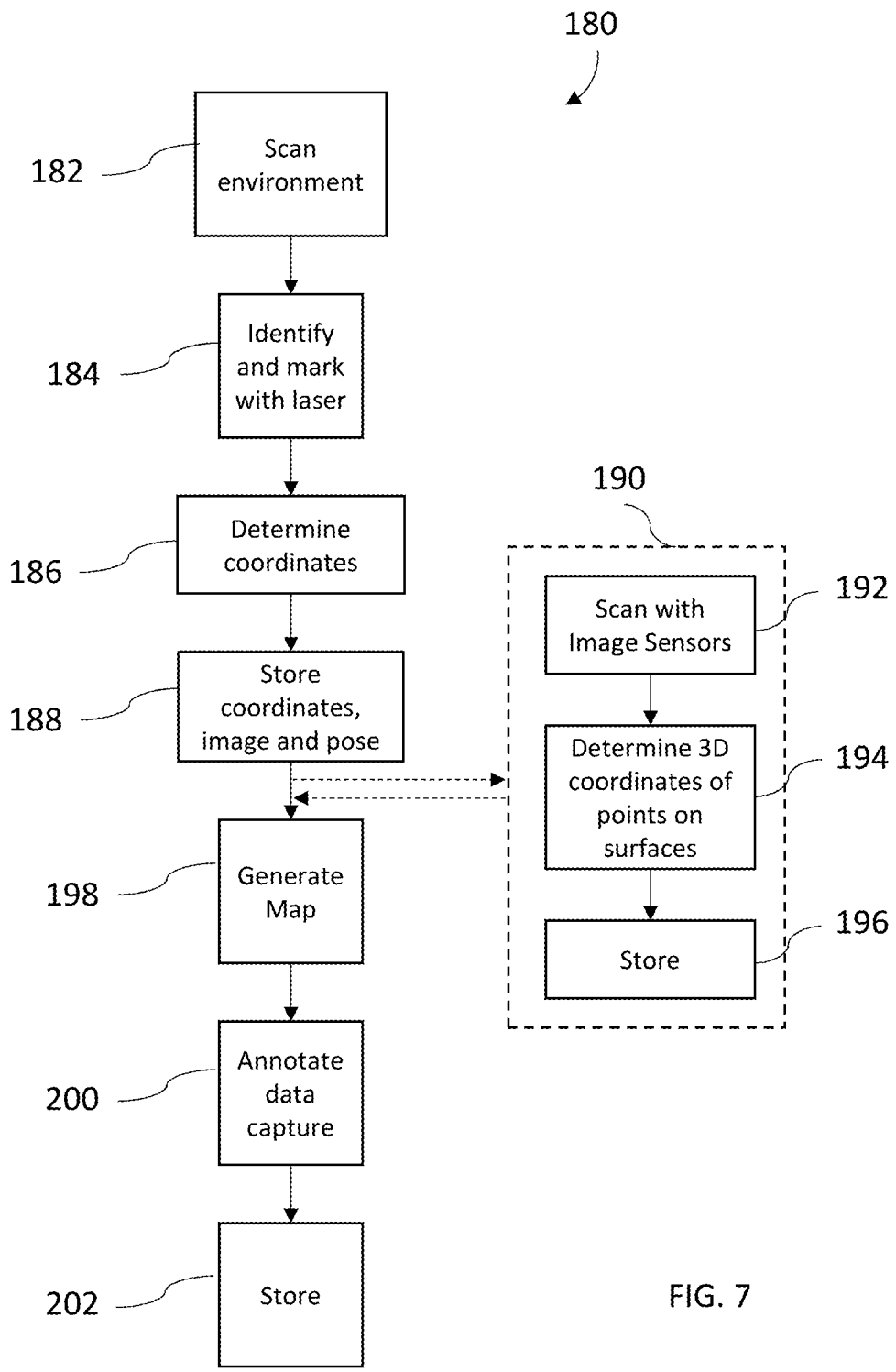
FIG. 7 is a flow diagram of a method of generating a data capture in accordance with an embodiment.
Figure 8:
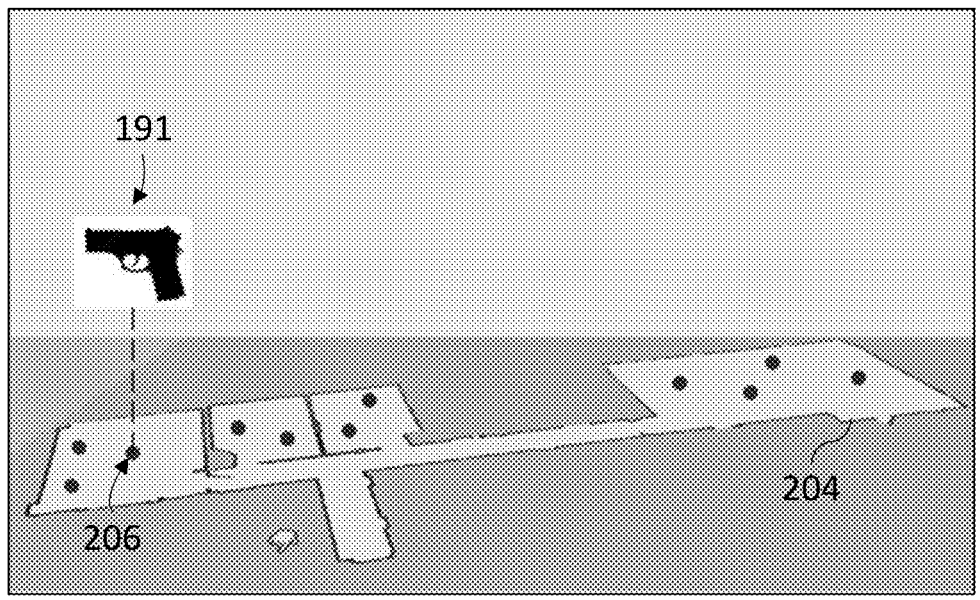
FIGS. 8-9 are views of annotated data captures generated with the method of FIG. 7 in accordance with an embodiment.
Figure 9:
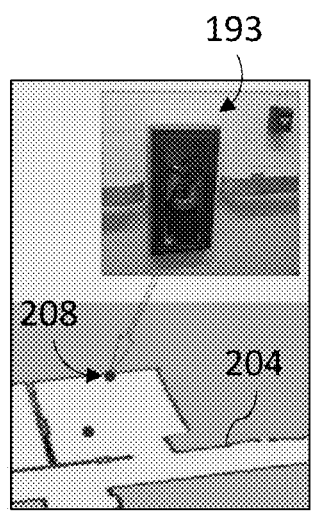

Referring now to FIG. 7, another method 180 is shown of generating a data capture having annotation that include 3D coordinates of objects within the scanned area. The method 180 begins in block 182 with the scanner device(s) 20 used for scanning the area. During the scanning process, the operator may see an object, such as evidence 191 (FIG. 8) or equipment 193 (FIG. 9) for example, that the operator may desire to locate more precisely within the data capture. Alternatively, or in addition, the operator may desire to acquire additional information of the object. In an embodiment, a laser projector (not shown) emits a visible beam of light that allows the operator to see the direction the system 20 is pointing. Once the operator locates the light beam from laser projector on the desired object, the method 180 proceeds to block 186 where the coordinates of the spot on the object of interest are determined. In one embodiment, the coordinates of the object are determined by first determining a distance from system 20 to the object. In addition to the distance, the 3D camera 60 also may acquire an image of the object. Based on knowing the distance along with the pose of the system 20, the coordinates of the object may be determined. The method 180 then proceeds to block 188 where the information (e.g. coordinates and image) of the object are stored in memory.

It should be appreciated that in some embodiments, the operator may desire to obtain a three-dimensional (3D) representation of the object of interest in addition to the location relative to the data capture. In this embodiment, the method 180 proceeds to scanning block 190 and acquires 3D coordinates of points on the object of interest. In an embodiment, the object is scanned with the 3D camera 60 in block 192. The system 20 then proceeds to determine the 3D coordinates of points on the surface of the object or interest in block 194. In an embodiment, the 3D coordinates may be determined by determining the pose of the system 20 when the image is acquired by the 3D camera. The pose information along with the distances and a registration of the images acquired by the 3D camera may allow the generation of a 3D point cloud of the object of interest. In one embodiment, the orientation of the object of interest relative to the environment is also determined from the acquired images. This orientation information may also be stored and later used to accurately represent the object of interest on the visualization of the data capture, such as a 2D/3D map of the environment. The method 180 then proceeds to block 196 where the 3D coordinate data is stored in memory.

The method 180 then proceeds to block 198 where a map 204 (FIG. 21, FIG. 22) may be generated as described herein. In an embodiment, the location of the objects of interest (determined in blocks 184-186) are displayed on the map 204 as a symbol 206, such as a small circle for example.

Figure 13:
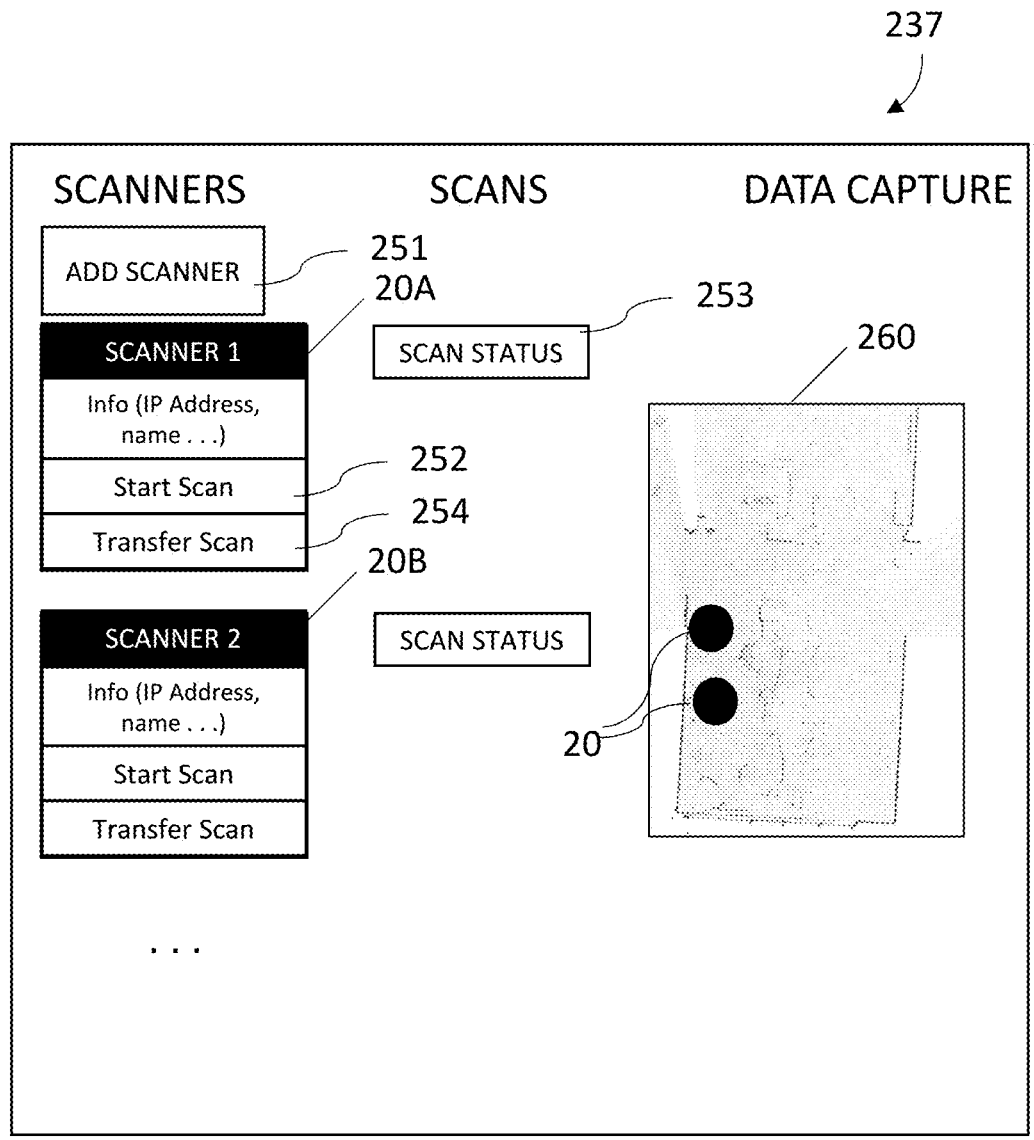

It should be appreciated that the map 204 may include additional user-defined annotations added in block 200, such as those described herein with reference to FIG. 13 and FIG. 18. The map 204 and the annotations are then stored in block 202. It should be noted that in one or more embodiments the data capture and the annotations are stored without the map 204 being generated in the block 202.

In use, the operator may select one of the symbols, such as symbol 206 or symbol 208 for example. In response, an image of the object of interest 191, 193 may be displayed. Where the object or interest 191, 193 was scanned to obtain 3D coordinates of the object, the 3D representation of the object of interest 191, 193 may be displayed.

In yet other embodiments of the technical solutions described herein, a 3D scan of the environment is captured using multiple data capture devices. The data capture devices can include one or more scanners of the same type, for example, laser scanners. Alternatively, or in addition, the data capture devices can include scanners of different type, for example, one or more laser scanners, one or more optical scanners, and the like. Further yet, the data capture devices can include other devices such as documentation devices that capture images, text, audio annotations, and the like. It should be appreciated that using multiple scanners allows for a reduction in scanning time. Further, as described in more detail herein, when the data from the multiple scanners is registered together while the scan is being performed, the operator can determine whether the environment has been adequately scanned and that the areas of interest have been captured. It should be appreciated that this saves time in avoiding having to return to the scan site. In an embodiment, a data capture is performed by a 3D laser scanner time-of-flight (TOF) coordinate measurement device, such as system 20. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

The laser scanners can include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A technical challenge exists where scanning an environment using a single data capture device, such as the scanning system 20, can take longer time particularly in cases with the environment being a large area. In such cases it is desirable to use multiple data capture devices, such as multiple scanning systems 20, to scan separate portions of the environment and combine such separate data captures from the respective scanning system to generate a global/combined "global data capture" for the overall environment in real time. However, using multiple operators for such separate data capture devices can be a challenge and increase costs.

Further, registering the data captures from the multiple scanning systems 20 can be a technical challenge because registering the data captures from the separate scanning systems 20 is required for generating the single global data capture from the captured data from the separate scanning systems 20. For example, to utilize the data captured, e.g., point clouds, by the multiple scanning systems 20, the data has to be processed. Such processing can include filtering, colorizing, converting the data from one format to another, and various other such compute resource intensive operations. The multiple data captures (scans) from the respective scanning systems 20 further have to be registered (aligned) in 3D space for combining the data into the single global data capture.

Typically, processing and registering of the captured data is not done on site, rather performed offline at a later time. Because of this the users may not be sure if all the needed data for generating the global data capture for the environment has been captured, and if the quality of the captured data up to the mark for generating the scan. Further, the users cannot be sure of the registration will be successful during the offline processing. Registering such multiple separate data captures from separate scanning systems 20 demands large amounts of data being transferred by/among the multiple scanning systems 20 being used, and hence, such registration is presently not performed in real time, among other technical reasons.

The technical solutions described herein address such technical challenges and facilitate generating the global data capture of an environment in real time using multiple data capture devices including multiple scanning systems 20, all of them being controlled by a single operator via a user interface. In other words, the technical solutions described herein facilitates a single operator to use multiple scanning systems 20 and other data capture devices substantially simultaneously and to combine the data from the multiple data capture devices to generate a single global data capture. Accordingly, the technical solutions described herein facilitate reducing time required for generating the global data capture by enabling use of multiple scanner devices on-site. Further, this can facilitate the processing and registration of the data to be performed dynamically and on-site.

Figure 10:
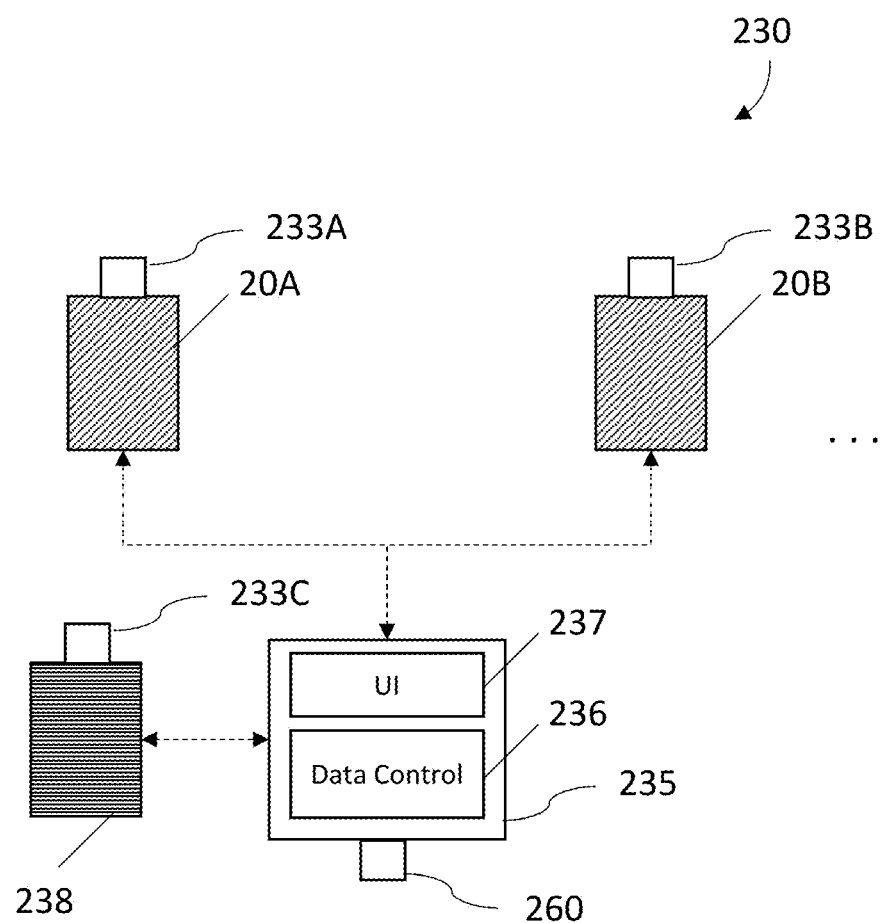
FIG. 10 is a scanning system that includes multiple data capture devices in accordance with an embodiment.

FIG. 10 depicts a block diagram of a system for scanning an environment using multiple scanner devices and a single controller according to one or more embodiments. The system 230 includes a controller 235 that is coupled with multiple scanning systems 20A, 20B. The controller 235 can further be coupled with other data capture devices, such as a documentation device 238, which can be a handheld scanner (e.g. FARO® FREESTYLE$^{3D}$, FARO® SCANPLAN™ manufactured by FARO Technologies, Inc. of Lake Mary, Fla., USA). It should be noted that the scanning systems 20A, 20B, can be of the same type or of different type. Accordingly, the data capture devices, including the scanning systems 20A, 20B, documentation device 238, etc., can all be different types of devices that are controlled by the controller 235. The controller 235 can control one or more operations of the coupled devices and receive data captured by such devices. This facilitates the multiple devices to scan the environment simultaneously.

The controller 235 can be another scanning system 20 in one or more examples. Alternatively, or in addition, the controller 235 is a computing device such as a laptop, a desktop, a tablet computer, a phone, or any other such computing device that facilitates executing one or more computer executable instructions. The controller 235 is coupled with the data capture devices via wired or wireless communication, such as using Ethernet, BLUETOOTH™, or any other communication protocol. In one or more examples, the controller 235 and the data capture devices are part of a network, such as a local area network (LAN), or a workgroup, and the like to facilitate data sharing between the controller 235 and the data capture devices. It should be noted that although only two scanning systems 20A, 20B, and one documentation device 238 are depicted in FIG. 23, in one or more examples, the system 230 can include different number of scanning systems and documentation devices.

Each data capture device captures respective data capture. For example, the scanning system 20A, 20B captures respective data capture 233A, 233B corresponding to the view that each of the scanning systems 20A, 20B faces. Further, the documentation device 238 captures data capture 233C. It should be appreciated that the data capture device may be located remote from each other. In one or more embodiments, the scanning systems 20A, 20B are located such that the areas scanned by each respective system 20A, 20B overlap. The data capture 233A, 233B can be accessed by a data controller 236 of the controller 235. The controller 235 further includes a user interface 237 that facilitates an operator to interact with the data capture devices, as well as the corresponding data captures and resulting global data capture 260.

In one or more examples, the controller 235 can include multiple devices, each one providing its respective user interface 237 to control the data capture devices in the system 230. For example, multiple computing devices, such as tablet computers, form the controller 235, and the multiple computing devices can all be used to control the data capture devices such as the scanning systems 20A, 20B, and the documentation device 238, simultaneously. The user interface 237 on each of the devices from the controller 235 updates as the status of one or more of the data capture devices changes. Alternatively, or in addition, the user interfaces 237 update as the status of each scan being captured by the data capture devices changes.

Figure 11:
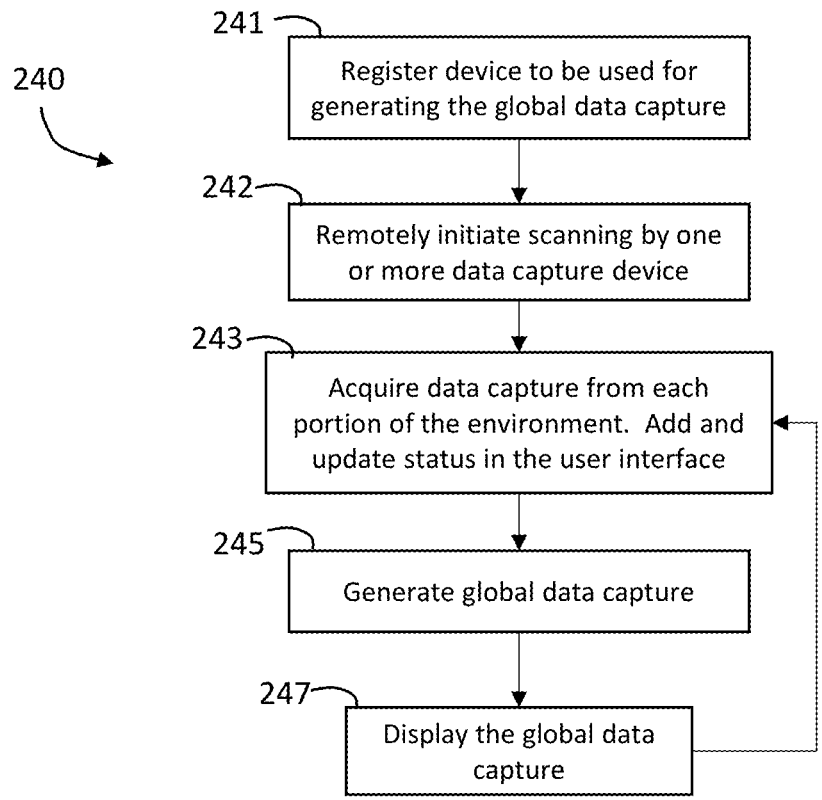
FIG. 11 is a flow diagram of a method of generating a global capture using multiple data capture devices concurrently in accordance with an embodiment.
Figure 12:
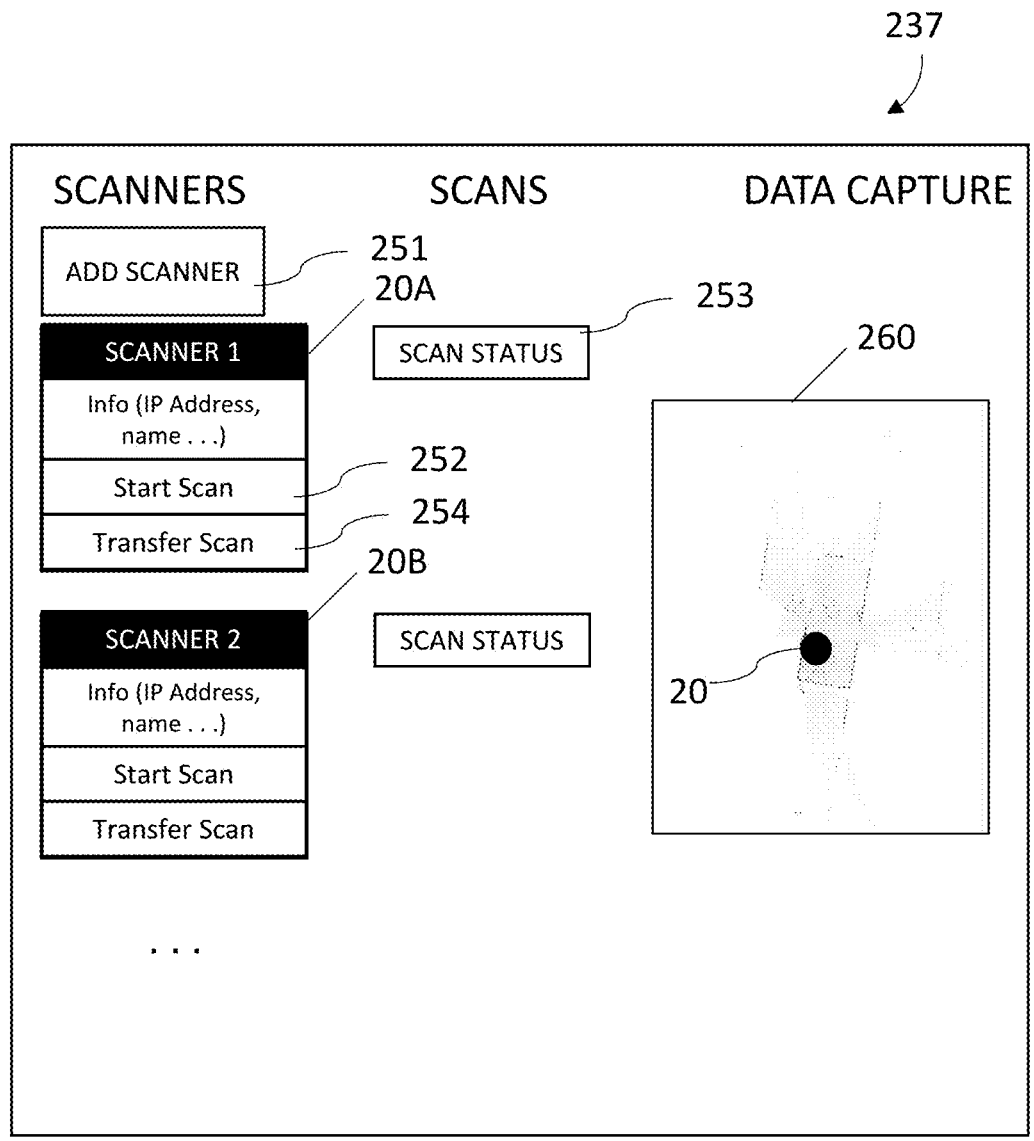
FIG. 12 and FIG. 13 depict user interface views of an environment being scanned simultaneously by multiple data capture devices in accordance with an embodiment.

FIG. 11 depicts a flowchart of a method for capturing a global data capture of an environment using a system of multiple data capture devices according to one or more embodiments. FIG. 12 depicts a view of the user interface 237 during a capture according to one or more embodiments. It is understood that the visualization in FIG. 12 is exemplary and that the user interface can be different in other embodiments. The method herein describes the controller 235 simultaneously controlling and capturing data from the scanning systems 20A, 20B. However, it is understood that the operations described for these devices can be used to control and capture data from other data capture devices in the system 230 in a similar manner.

The depicted method 240 includes registering the data capture devices, such as the one or more scanning systems 20A, 20B for scanning the global data capture 260, at 241. In one or more examples, the user interface 237 provides a user interface element 251, such as an icon, a button, etc. that the operator uses to initiate a new user interface page, such as in a tab. The operator can provide information for the data capture device, say the scanning system 20A, that is to be added. For example, the information can include a device name, device model, device location, and other such information about the data capture device. Alternatively, or in addition, the one or more data capture device information field is populated automatically by receiving the data from the data capture device programmatically.

The operator adds (multiple) scanning systems 20A, 20B to generate the global data capture 260 by combining corresponding data captures 233A, 233B. FIG. 12 depicts that the operator has added the two scanning systems 20A, 20B. The user interface 237 includes a user interface element 252 that enables the operator to remotely start capturing data from each of the scanning systems 20A, 20B that have been registered with the controller 235. Accordingly, the method 240 includes initiating a data capture from one or more scanning systems 20A, 20B, at 242.

The user interface 237 further includes user interface elements 253 that depict a status for each of the scanning systems 20A, 20B. The status can include a progress bar indicative of a duration of the scan. The status can further include a notification of a stage of the data capture such as capturing, transferring, importing, processing, registering, mapping, saving, and the like. The status can further include device status information. For example, the device status can include battery state, storage fill state, hardware warnings/information, and the like. The device status information can further include disconnected, ready for scanning, scanning, or other operations being performed by the scanning systems 20A, 20B. The status indicative of operation being performed can be finer, or granular, such as measuring points, capturing sensor data, capturing images, and so on. Accordingly, the method 240 includes adding and updating the scan status in the user interface 253 once the scan has been initiated, at 243. In one or more examples, each recorded data capture (e.g. 233A, 233B, 233C) can have its own status. For example, the status of a data capture can be capturing/recording, transferring, registering, etc. Accordingly, in case of the multiple scanning systems 20A, 20B, for example, the two different data captures 233A and 233B that are recording at the same time can have respective status.

The method 240 also includes acquiring the data capture, at 243. The data can be acquired in the form of a file after the data capture is complete. Alternatively, or in addition, the data can be acquired as streaming data as the data is being captured by the scanning system 20A, 20B. Further, in one or more examples, the captured data is transferred partially to the controller 235. Such partial data transfer can reduce network bandwidth usage. In one or more examples, the operator can select what portions of the captured data is to be transferred from the one or more data capture devices. For example, the operator, on the controller 235, is shown a list of one or more data captures from the scanning system 20A and the operator can then choose a data capture from those data captures. A partial data capture i.e. a subset of the points from the chosen data capture are transferred to the controller 235 in response. A predetermined set of points from the point cloud that is captured by the scanning system 20A is transferred. Alternatively yet, in one or more examples, the scanning system 20A dynamically selects the partial data that is to be transferred to the controller 235 for registration. For example, a subsampled data capture or low resolution data capture is transferred. In one or more examples, the operator can select between different subsample variants and resolutions. The subsampling is used because the network bandwidth between scanning system 20A and the controller 235 is limited. Accordingly, in one or more examples, the subsampling is performed depending on the available bandwidth. For example, the controller 235, or the scanning system 20A detects a parameter associated with the network bandwidth, such as, transfer speed. The network parameter is used to further determine a sampling rate for transferring the partial data from the data capture to the controller 235.

Accordingly, instead of transferring the entire captured set of points, a subset/partial data is transferred to the controller 235 for registering the portion of the environment that is captured by the scanning system 20A. This reduces the amount of data that is to be transferred via the network/communication interface between the system 20A and the controller 235. Accordingly, the registration of the multiple portions captured and (partially) transferred by the multiple scanning systems 20 can be performed at real time with the amount of data limited by partial data transfers.

Further yet, in one or more examples, the scanning system 20A transfers the partial data to the controller 235 while the scanning system 20A is still capturing the point cloud. In an embodiment, the partial data that is transferred is based on the sampling rate, which in turn can depend on the network bandwidth. Such transfer occurs automatically once the scanning system 20A starts capturing the point cloud(s). In one or more examples, the operator can initiate data capture directly on the scanning system 20A (not via the controller 235). In such a case, the controller 235 detects that the scanning system 20A is capturing data, and initiates the data transfer automatically.

In in one or more examples, once the data is captured, the operator can transfer captured data from the scanning system 20A to the controller 235, at 244. In one or more examples, the transfer is initiated using a user interface element 254. In one or more examples, the transfer user interface element 254 displays a list of available data captures on the scanning system 20A. The operator can select which of the data captures to transfer. The transfer can be performed using network communication. Alternatively, or in addition, in one or more examples, the transfer is performed by using a physical media, such as a secure digital (SD) card, universal serial bus (USB) drive, and the like.

The controller 235 generates the global data capture 260 using the transferred scans from the multiple scanning systems 20A, 20B, at 245. The user interface 237 displays the global data capture 260 that is generated so far. As each point cloud/other data is captured and transferred, the global data capture 260 is incrementally updated (FIG. 13). All the data captures that are registered are combined to update and display the global data capture 260, at 247. The combining of the captured data from each respective scanning system 20 can be done using simultaneous localization and mapping techniques, such as Kalman filtering, parallel tracking and mapping, and the like. Alternatively, or in addition, registration algorithms using targets (spheres, checkerboards or similar) or directly the 3D points (like Iterative Closest Points (ICP), Normal Distributions Transform (NDT) or similar) are used.

Accordingly, the controller 235 generates the global data capture 260 for the entire environment based on scanned data and/or partial data received from each respective data capture device. The controller 235 can communicate with each of the data capture device via one or more communication protocols in a wireless manner. For example, the communication can be performed using a mesh network where the data capture devices and the controller 235 form a mesh network. Alternatively, or in addition, the controller 235 communicates with the data capture devices via a wireless network such as a Long-Term Evolution (LTE) network (5G/4G/3G etc.) a WI-FI® network, or any other such communication protocol.

The data is acquired as described herein using the various data capture devices such as the laser scanning system 20. The captured data can include one or more annotations and points of interest as described herein. In one or more examples, using the acquired scan data, maps (or submaps) are created for each of the portions that are in view of the scanning systems 20.

Combining the partial data captures to generate the global data capture 260 is performed using simultaneous localization and mapping using a particle filter, an incremental combining of the partial data captures, or any other suitable technique. The partial data captures are aligned for being combined based on a starting point 251 in one or more examples. Alternatively, or in addition, the alignment of the data captures is performed using one or more overlapping regions from the data captures. The reference coordinate systems of the data captures are matched/registered with each other so that the data captures can be combined.

The alignment can be performed automatically using such features. For example, the geometrical structure of a data capture is matched against second data capture until an overlay is reached within a predetermined probability threshold. In this embodiment a line matching methodology such as Iterative Closest Point (ICP) for example, may be used for the alignment of the data sets. Once the second data capture is in the correct position the offset vector from the previous data capture origin to the new data capture origin is determined in the coordinate system of the previous data capture. This vector is automatically applied to all positions in the new combined data capture. This process may be repeated n times. At the end a complete global data capture 260 is generated using the multiple data captures.

In one or more examples, the operator aligns the data captures using the one or more common/overlapping features via the user interface 237 in the controller 235. In one or more examples, the method continuously operates to generate an updated global data capture as new data is captured by the scanning systems 20.

In one or more examples, the global data capture 260 is concurrently displayed at a remote server, such as at a command center, and an operator at the remote server can annotate the global capture 260. It should be noted that although the figures depict the global data capture 260 as a 2D floorplan, it can be a 3D scan in other examples.

In one or more embodiments, the generation of the global data capture 260 by combining the data captures from the multiple scanning systems is performed iteratively. The combining is performed not only after all of the scanning by the multiple scanning systems is completed, rather after every single data capture by the respective scanning systems. As described earlier, the capturing data also includes recording notes, images, audio notes etc. while scanning the point clouds.

In one or more examples, a data capture device from the multiple data capture devices is used for multiple scans by moving the data capture device in-between separate data capture scans. Each scan adds data to the global data capture 260. This continuously grows the combination of all the recorded data captures while the system continues to register, grow, and merge data captures according to the latest registration results that are reevaluated and updated with each additional scan.

In one or more examples, the capturing can also start with one data capture device, say the scanning system 20A coupled with the controller. After the scanning has started, one or more additional devices can be connected to the controller while the first data capture device is already scanning. In a similar manner, a data capture device can be disconnected from the controller 235 while the other data capture devices continue to scan and store data captures.

Accordingly, the technical solutions described herein facilitate generating a 2D or 3D model of an environment dynamically using multiple scanning systems operating cooperatively. The scanning systems can be controlled remotely from a central controller to scan and record multiple separate data captures. The multiple scanning systems acquire data corresponding to the various separate portions of an environment, and the separate data captures are combined by the central processor to generate the global data capture of the environment. In this manner, a global data capture of the overall environment is generated faster because the multiple data capture devices can be controlled and operated simultaneously. This can provide advantages in reducing the time for a public safety team. Additionally, in an embodiment the data captures are automatically documented. In the case the central processor is a remote server, an emergency team at the remote location can also visualize almost the entire operation and take dynamic decisions based on the global data capture and data being acquired and transmitted by the multiple scanning systems. In one or more examples, an operator at the remote server can annotate the global data capture, the annotations being visible to the field operators dynamically.

The technical solutions described herein facilitate multiple scanners (2D/3D), which can be of different types, to simultaneously send at least a first portion of their data to a central controller. The central controller then registers the data dynamically as the scanners are performing the data capture. The portion of the data that is transmitted includes the data points that are used for registration. In one embodiment, all of the captured data is transmitted. The transmitted data is selected from the captured data using subsampling in one or more examples. The subsampling is performed based on the available network bandwidth in one or more examples. In one or more examples, the various devices are connected to a system that automatically manages the data management (storage and transfer of data) and the processing (single data processing and registration) in the field.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system of generating a three-dimensional (3D) scan of an environment, the system comprising:
    a plurality of 3D scanners comprising a first 3D scanner at a first position and a second 3D scanner at a second position, the first position being different from the second position;
    a controller operably coupled to the 3D scanners via a common communications network; wherein:
    the first 3D scanner is configured to acquire a first set of 3D coordinates and generate a first subsample data of the first set of 3D coordinates, the first 3D scanner is further configured to transmit the first subsample data to the controller;
    the second 3D scanner is configured to acquire a second set of 3D coordinates and generate a second subsample data of the second set of 3D coordinates, the second 3D scanner is further configured to transmit second subsample data to the controller; and
    the controller is configured to register the first subsample data and the second subsample data to each other while the first set of 3D coordinates and the second set of 3D coordinates are being acquired.

2. The system of claim 1, wherein the first subsample data is a lower resolution than the first set of 3D coordinates.

3. The system of claim 2, wherein the second subsample data is a lower resolution than the second set of 3D coordinates.

4. The system of claim 1, wherein at least one of the controller, first scanner, or second scanner is configured to detect a parameter associated with the common communications network.

5. The system of claim 4, wherein a sampling rate of at least one of the first subsample data and the second subsample data is based at least in part on the parameter.

6. The system of claim 4, wherein the parameter is a bandwidth of the common communications network.

7. The system of claim 1, wherein:
    the transmitting of the first subsample data is performed simultaneously with the acquiring of the first set of 3D coordinates; and
    the transmitting of the second subsample data is performed simultaneously with the acquiring of the second set of 3D coordinates.

8. A method of scanning an environment, the method comprising:
    positioning a first 3D scanner in a first position;
    positioning a second 3D scanner in a second position, the second position being different than the first position;
    connecting the first 3D scanner, the second 3D scanner, and a controller to a common communications network;
    acquiring a first set of 3D coordinates with the first 3D scanner;
    generating a first subsample data from the first set of 3D coordinates;
    acquiring a second set of 3D coordinates with the second 3D scanner;
    generating a second subsample data from the second set of 3D coordinates;
    transmitting the first subsample data and the second subsample data to the controller while the first set of 3D coordinates and the second set of 3D coordinates are being acquired; and
    registering the first subsample data and the second subsample data to each other while the first set of 3D coordinates and the second set of 3D coordinates are being acquired.

9. The method of claim 8, wherein the first subsample data is a lower resolution than the first set of 3D coordinates.

10. The method of claim 8, further comprising detecting a parameter associated with the common communications network.

11. The method of claim 10, further comprising changing a sampling rate of at least one of the first subsample data and the second subsample data is based at least in part on the parameter.

12. The method of claim 11, wherein the parameter is a bandwidth of the common communications het work.

13. The method of claim 8, wherein the first subsample data and the second subsample data are transmitted to the controller simultaneously.

14. A system comprising:
    a display device;
    a memory device; and
    a controller comprising one or more processors coupled with the display device and the memory device, the one or more processors configured to:
    receive, substantially simultaneously, via a common communications network, first subsample data of a first set of 3D coordinates being acquired by a first 3D scanner and a second subsample data of a second set of 3D coordinates being acquired by a second 3D scanner;
    register the first subsample data and the second subsample data to each other while the first set of 3D coordinates and the second set of 3D coordinates are being acquired.

15. The system of claim 14, wherein the first subsample data is a lower resolution that the first set of 3D coordinates.

16. The system of claim 15, wherein the second subsample data is a lower resolution than the second set of 3D coordinates.

17. The system of claim 14, wherein the one or more processors are further configured to determine a parameter associated with the common communications network.

18. The system of claim 17, wherein the one or more processors are further configured to change a sampling rate of at least one of the first subsample data and the second subsample data is based at least in part on the parameter.

19. The system of claim 17, wherein the parameter is a network bandwidth.

* * * * *